United States Patent [19]

Hardeman et al.

[11] Patent Number: 5,368,945
[45] Date of Patent: Nov. 29, 1994

[54] RESIN COMPOSITION BASED ON A POLYESTER RESIN, AN AMINO RESIN AND AN EPOXY RESIN

[75] Inventors: Gerard Hardeman, Amsterdam; Wilhelmina Westerhof, Zwolle; Anthonie J. Plak, Hattem; Anneke Beens-Onstenk, Genemuiden, all of Netherlands

[73] Assignee: Stamicarbon B.V., Netherlands

[21] Appl. No.: 3,471

[22] Filed: Jan. 12, 1993

Related U.S. Application Data

[63] Continuation of Ser. No. 629,815, Dec. 21, 1990, abandoned.

[30] Foreign Application Priority Data

Dec. 23, 1989 [NL] Netherlands ............. 8903155

[51] Int. Cl.⁵ .............................. B32B 15/08
[52] U.S. Cl. ......................... 428/458; 428/451; 428/480; 427/359; 427/367; 427/383.1; 427/385.5; 427/386; 427/388.1; 427/388.3; 106/285
[58] Field of Search ............ 428/458, 480, 451, 413, 428/483, 502, 505; 106/285; 427/360, 367, 359, 374.2, 883.1, 886, 385.5, 388.1, 388.3, 359, 367, 383.1, 386

[56] References Cited

U.S. PATENT DOCUMENTS

| | | |
|---|---|---|
| 3,511,797 | 5/1970 | Mellan et al. . |
| 3,548,026 | 12/1970 | Weisfeld et al. . |
| 4,071,578 | 1/1978 | Lasher . |
| 4,255,553 | 3/1981 | Mizhmura et al. . |
| 4,304,804 | 12/1981 | Fitko . |
| 4,340,519 | 7/1982 | Kotera et al. . |
| 4,340,698 | 7/1982 | De Jongh et al. . |

FOREIGN PATENT DOCUMENTS

| | | |
|---|---|---|
| 0110451 | 6/1984 | European Pat. Off. . |
| 0136263 | 4/1985 | European Pat. Off. . |
| 0150476 | 7/1987 | European Pat. Off. . |
| 0330729 | 9/1989 | European Pat. Off. . |
| 53-33918 | 9/1979 | Japan . |

OTHER PUBLICATIONS

Japanese Abstract-JP54125230, DW7945.
"Solvent-borne interior can lacquers based on Epikote resins", Epikote Technical Manual EP 2.9, pp. 5-19.

*Primary Examiner*—John Kight, III
*Assistant Examiner*—Duc Truong
*Attorney, Agent, or Firm*—Cushman, Darby & Cushman

[57] ABSTRACT

The invention relates to a coating composition based on a polyester resin, an amino resin and an epoxy resin.

The polyester resin is a carboxyl-functional polyester with a molecular weight of between 12000 and 25000.

9 Claims, No Drawings

RESIN COMPOSITION BASED ON A POLYESTER RESIN, AN AMINO RESIN AND AN EPOXY RESIN

This is a continuation of application Ser. No. 07/629,815, filed Dec. 21, 1990 now abandoned.

BACKGROUND OF THE INVENTION

The invention relates to a resin composition based on a polyester resin, an amino resin and an epoxy resin.

Such resin composition is already known from European patent EP-B-150476. This patent publication describes a resin composition based on a hydroxyl-functional polyester resin, an amino resin and an epoxy resin, which is used as binding agent for interior can coatings in the food industry.

A disadvantage of this resin composition is that can coatings based on such resin compositions have insufficient resistance to lactic acid.

SUMMARY OF THE INVENTION

An object of the invention is to obtain resin compositions which give can coatings good resistance to chemicals, particularly lactic acid, and also give such coatings good flexibility.

The invention includes: 1) resin compositions comprising a polyester resin, an amino resin and an epoxy resin wherein the polyester resin is a carboxyl-functional polyester with a molecular weight of between 12,000 and 25,000; 2) coating compositions comprising the resin composition; 3) substrates and articles of manufacture coated with a layer of the defined coating composition; and 4) a method of forming the coating composition.

DETAILED DESCRIPTION OF THE INVENTION

By this invention, resin compositions comprising a carboxylfunctional polyester resin, an amino resin and an epoxy resin are obtained which yield can coatings with good resistance to lactic acid and with a good flexibility.

According to a preferred embodiment of the invention the carboxyl-functional polyester has a molecular weight of between 14000 and 17000.

The acid number of the carboxyl-functional polyester is between 4 and 75, preferably between 4 and 20, more preferably between 6 and 16.

The carboxyl-functional polyester is preferably the reaction product of a hydroxyl-functional polyester and an acid anhydride or a dicarboxylic acid. Suitable acid anhydrides are, for example, phthalic anhydride, tetrahydrophthalic anhydride, succinic anhydride, maleic anhydride, trimellitic anhydride, pyromellitic anhydride and/or hexahydrophthalic anhydride. Preferably, use is made of trimellitic anhydride and phthalic anhydride. Suitable dicarboxylic acids are, for example, adipic acid, isophthalic acid, hexahydroterephthalic acid and sebacic acid. Preferably, use is made of an acid anhydride.

The reaction between the hydroxyl-functional polyester and the acid anhydride or the dicarboxylic acid is preferably effected (in a second step) after the hydroxyl-functional polyester synthesis, but the aforementioned reaction can also be effected during the curing of the resin composition.

In the reaction between the hydroxyl-functional polyester and the acid anhydride or the dicarboxylic acid the molar ratio of the hydroxyl groups and the acid anhydride or dicarboxylic acid groups is preferably almost equimolar. This results in a hydroxyl value of substantially 0.

The hydroxyl-functional polyester can be obtained by causing polyalcohols to react with acids or acid anhydrides. The molar ratio of the polyalcohols and the acids or acid anhydrides may vary between 1.2:1.0 and 1.0:1.0 for the preparation of the hydroxyl-functional polyester.

The carboxyl-functional polyester can also be obtained directly, by causing polyalcohols to react with acids or acid anhydrides. The molar ratio of the polyalcohols and the acids or acid anhydrides may vary between 1.0:1.2 and 1.0:1.0 for the preparation of the carboxyl-functional polyester.

Suitable polyalcohols for the preparation of the carboxyl- and hydroxyl-functional polyester are, for example, ethylene glycol, propylene glycol, diethylene glycol, butanediol (1,4), hexanediol (1,6), neopentyl glycol, trimethylpentanediol, ester of hydroxypivalic neopentyl glycol, tricyclodecanedimethanol, cyclohexanedimethanol, bisphenol-A-bishydroxyethyl ether, trimethylolpropane and/or pentaerythritol.

Suitable acids for the preparation of the carboxyl- and hydroxyl-functional polyester are, for example, isophthalic acid, terephthalic acid (ester of dimethylterephthalic acid), adipic acid, sebacic acid, hexahydroterephthalic acid, decanedicarboxylic acid, 5-t-butylisophthalic acid and/or dimerised fatty acids or acid anhydrides such as phthalic anhydride, tetrahydrophthalic anhydride, succinic anhydride, maleic anhydride, trimellitic anhydride, pyromellitic anhydride and/or hexahydrophthalic anhydride.

The esterification reaction is preferably carried out in a nitrogen atmosphere at temperatures of between 180° C. and 260° C. Catalysts such as dibutyltin oxide, tin chloride or tetrabutoxy titanate, and antioxidants such as triphenyl phosphite may be used as additives. The reaction water released during the reaction is removed by distillation. The desired degree of esterification is reached by means of azeotropic distillation or vacuum in the last phase. The reaction results in a polyester that can subsequently be dissolved in an organic solvent or a mixture of solvents. Mixed aromatic hydrocarbons and esters of glycol ether, such as methylpropylene glycol acetate or ethylpropylene glycol acetate, are, for example, be used for this purpose.

Suitable amino resins are benzoguanamine resins, melamine resins and/or urea-formaldehyde resins. Preferably, benzoguanamine resin and/or melamine resin is used as amino resin.

Benzoguanamine and melamine resins can be obtained by converting benzoguanamine and melamine, respectively, into methylol compounds, with the aid of formaldehyde, and then etherifying said methylol compounds with ($C_1$–$C_4$) alcohols so as to obtain the desired degree of etherification. The amount of formaldehyde per mole of amino compound varies between 2 and 4 moles in the case of benzoguanamine and between 3 and 6 moles when use is made of melamine. Alkaline conditions are usually chosen for the methylolation step. In the subsequent etherification with the aid of alcohols (preferably n-butanol or isobutanol) use is made of molar amounts of between 0.5 and 1.5 moles per mole of formaldehyde. The etherification takes place under acid conditions and the reaction water formed is removed by azeotropic distillation. As end product, a benzoguanamine resin or a melamine resin is obtained and dissolved in the alcohol used for the etherification. Optionally, the concentration and viscosity can be adjusted to the values required by distillative removal of this alcohol.

Suitable epoxy resins are, for example, bisphenol-A-epoxy compounds, hydrogenated bisphenol-A-epoxy compounds and aliphatic epoxy compounds. Preferably, use is made of bisphenol-A-epoxy compounds, such as the diglycidyl ether of bisphenol-A and oligomers thereof.

The resin composition according to the invention can be obtained by first preparing a pigment paste by mixing a carboxyl-functional polyester resin with pigment, for example titanium dioxide, in weight ratios of between 2:3 and 1:1. During this preparation the temperature of the paste may not rise above 70° C. Then, after cooling to room temperature, a suitable amino resin, a suitable epoxy resin and a catalyst, such as dodecylbenzene sulphonic acid or paratoluene sulphonic acid, are added to the prepared paste. The catalyst is added in an amount of less than 2 wt. %, relative to the resin composition. Optionally, use may be made of additives such as flow improvers and substrate moisturizers, such as cellulose acetobutyrate.

In this preparation the polyester resin:amino resin weight ratio is preferably between 60:40 and 80:20, the polyester resin:epoxy resin weight ratio preferably being between 70:30 and 80:20 and the polyester resin:-(amino resin and epoxy resin) weight ratio preferably being between 50:50 and 60:40.

The resin composition may be diluted with solvents, for example aromatic hydrocarbon fractions such as Solvesso 200 (trade name of Esso), methylpropylene glycol acetate (MPA) and ethyl-3-ethoxypropionate. In this manner a composition with a solids content of between 40% and 60 wt. % can be obtained.

U.S. Pat. No. 3,548,026 describes resin compositions based on epoxy resins and low-molecular weight carboxyl-functional polyesters which are based on a prepolyester having a molecular weight of 2000–10000. These resin compositions may optionally also contain amino resins. However, coating compositions based on these resin compositions are insufficiently flexible.

The resin composition according to the invention may be applied with the aid of a roller coater to a metal substrate, for example, tin-plate, aluminium or black-plate steel, in a dry layer thickness of 8–12 μm. The enamelling cycle takes 12–15 minutes at 200° C.–210° C.

The resin composition according to the invention is particularly well suited for use as so-called interior white can coatings, but may also be used for coil coatings.

EXAMPLES

In the examples below, the following tests were used:

The molecular weight was determined via gas phase chromatography (GPC) using a polyester-styrene standard.

The resistance to lactic acid was determined visually in a 2% lactic acid solution after sterilization for 1 hour at 129° C.

The flexibility was determined visually after punching and sterilization of a 'DSM Resins standard can'.

In addition, the flexibility is measured via the so-called 'wedge-bend test'. In this test a 'DSM Resins standard can' is conically deformed by means of an impact, after which the number of defective millimeters of the coating is determined (with a magnifier; magnification 8×). This determination takes place after immersion in a copper sulphate/hydrochloric acid solution. The aim is to obtain the lowest possible values.

The above tests are described in 'Epikote Technical Bulletin EP 2.9' of Shell Chemicals which is incorporated by reference herein.

The invention is further explained by the following examples without, however, being limited thereto.

EXAMPLES

EXAMPLE I

Preparation of Polyester Resin 14.11 parts by weight of ethylene glycol, 25.23 parts by weight of neopentyl glycol, 37.77 parts by weight of isophthalic acid, 37.77 parts by weight of terephthalic acid and 0.05 parts by weight of tin chloride were heated, in a nitrogen atmosphere, in a glass reaction flask equipped with a mechanical stirrer, a thermometer and a Vigreux distillation column. The esterification reaction started at 180° C. and the reaction water formed was removed by distillation. The maximum reaction temperature was 260° C. When the reaction mixture had become clear, it was subjected to azeotropic distillation using an aromatic hydrocarbon fraction (Solvesso 150, trade name of Esso) until an acid value of 1 was obtained.

After cooling to 190° C., 166 parts by weight of phthalic anhydride were added and the reaction mixture was maintained at 190° C. for 1 hour. The resin obtained was diluted to a solids content of 40% with a solvent mixture consisting of Solvesso 150, Solvesso 200 and MPA, in a weight ratio of 1:1:2.

The final acid value of the solid resin was 8. The viscosity measured in an Emila with a 100 spindle, at 23° C., was 20 dPa.'s. The number average molecular weight was determined by means of GPC using a polyester-styrene standard and amounted to 15,000.

EXAMPLE II

Example of a Resin Composition 25.3 parts by weight of titanium dioxide (TR92 of Tioxide, LTD, UK) were added to 21.09 parts by weight of a carboxyl-functional polyester resin obtained according to Example I (dissolved in Solvesso 150, Solvesso 200 and MPA; 8.44 parts by weight of solids). This mixture was then ground to a pigment paste.

During the preparation the temperature of the paste did not rise above 70° C. After cooling to room temperature, 18.37 parts by weight of polyester resin according to Example I (dissolved in Solvesso 150, Solvesso 200 and MPA; 7.35 parts by weight of solids), 9.65 parts by weight of benzoguanamine resin (dissolved in Solvesso 150, n-butanol; 7.04 parts by weight of solids) (Uramex B 70600-RB-73 of DSM Resins BV), 6.09 parts by weight of epoxy resin (dissolved in diacetone alcohol; 5.48 parts by weight of solids) (Epikote 834 of Shell Chemie BV) and 0.75 parts by weight of dodecylbenzene sulphonic acid (Nacure 5225 of King Industries) were mixed. The mixture was then diluted with isophorone to a viscosity of 100–120 seconds flow time (DIN cup 4 at 23° C., DIN standard 53211).

The composition obtained was applied to tin-plate, aluminium and black-plate steel, in a layer thickness of 10 μm, using a roller coater, and subjected to an enamelling cycle of 12–15 minutes at 210° C.

EXAMPLE III AND COMPARATIVE EXPERIMENTS A-B-C

Test Results of Resin Compositions

The following properties regarding mechanical strength and resistance were determined in resin compositions obtained as described in Example II:
a) flexibility after punching of a can ('DSM Resins standard can'),
b) flexibility after sterilization of the can ('DSM Resins standard can'),
c) flexibility via the 'wedge-bend test', and
d) resistance to lactic acid.

Four resin compositions (III-A-B-C) based on different polyesters were compared:
III. resin composition based on a high-molecular carboxyl-functional polyester resin (molecular weight 15,000),
A. resin composition based on a low-molecular carboxyl-functional polyester resin (molecular weight 2,200),
B. resin composition based on a high-molecular hydroxyl-functional polyester resin (molecular weight 15,000) and
C. resin composition based on a low-molecular hydroxyl-functional polyester resin (molecular weight 2,000).

TABLE I

| resin composition | III | A | B | C |
| --- | --- | --- | --- | --- |
| Mn | 15,000 | 2,200 | 1,5000 | 2,000 |
| acid value | 8 | 28 | 2 | 3 |
| hydroxyl value | 0 | 0 | 6 | 22 |
| flexibility after punching | xxx | xxx | xxx | xxx |
| flexibility after sterilization | xxx | x | xxx | x |
| wedge-bend (mm) | 35 | 80 | 30 | 60 |
| resistance to lactic acid | xxx | xxx | x | x |

The properties 'flexibility after punching', 'flexibility after sterilization' and 'resistance to lactic acid' were visually determined:
xxx = excellent;
xx = satisfactory;
x = unsatisfactory.

The above results show that resin compositions based on carboxyl-functional polyester resins with a molecular weight of 15,000, an amino resin and an epoxy resin produce excellent resistance to lactic acid combined with excellent flexibility after sterilization.

We claim:
1. A can or coil coating composition which is resistant to lactic acid comprising:
  a polyester resin, which is a carboxyl-functional polyester with a number average molecular weight between 12,000 and 25,000;
  an amino resin; and
  an epoxy resin in a solvent;
  wherein the carboxyl-functional polymer has an acid number of between 4 and 75 and a hydroxyl value of substantially zero.
2. A coating composition according to claim 1, wherein said carboxyl-functionel polyester has a molecular weight of between 14,000 and 17,000.
3. A coating composition according to claim 1, wherein the acid number of said carboxyl-functional polyester is between 4 and 20.
4. A coating composition according to claim 1, wherein the acid number of said carboxyl-functional polyester is between 6 and 16.
5. A coating composition according to claim 1, wherein said carboxyl-functional polyester is the reaction product of a hydroxyl-functional polyester and an acid anhydride.
6. A coating composition according to claim 1, wherein said carboxyl-functional polyester is the reaction product of a hydrxyl-functional polyester and a dicarboxylic acid.
7. A coating composition according to claim 1, wherein said amino resin is selected from the group consisting of benzoguanamine resins, melamine resins, and urea-formaldehyde resins.
8. A coating composition according to claim 1, wherein said epoxy resin is selected from the group consisting of bisphenol-A-epoxy compounds, hydrogenated bisphenol-A-epoxy compounds and aliphatic epoxy compounds.
9. A coating composition according to claim 1, wherein said coating composition is diluted with solvent to make a solution with a solids content of 40–60 wt. %.

* * * * *